United States Patent [19]

Castellucci

[11] Patent Number: 5,270,428
[45] Date of Patent: Dec. 14, 1993

[54] CORROSION-RESISTANT SILANE POLYMER COATING COMPOSITIONS

[75] Inventor: Nicholas T. Castellucci, San Pedro, Calif.

[73] Assignee: Northrop Corporation, Los Angeles, Calif.

[21] Appl. No.: 959,873

[22] Filed: Oct. 13, 1992

Related U.S. Application Data

[63] Continuation of Ser. No. 631,562, Dec. 21, 1990, Pat. No. 5,206,285.

[51] Int. Cl.$^5$ .................. C08G 77/18; C08G 77/26
[52] U.S. Cl. .................................. 528/38; 523/421; 524/266; 524/588; 525/477; 428/418
[58] Field of Search ............... 523/421; 524/266, 588; 525/477; 528/38; 428/418

[56] References Cited

U.S. PATENT DOCUMENTS 5,025,049 6/1991 Takarada et al. .................. 524/588

FOREIGN PATENT DOCUMENTS 54-63176 5/1979 Japan .
56-16573 2/1981 Japan .

Primary Examiner—Robert E. Sellers
Attorney, Agent, or Firm—Terry J. Anderson; Robert B. Block; Karl J. Hoch, Jr.

[57] ABSTRACT

Silane polymer coating compositions which have excellent bonding properties for metallic surfaces and which make such surfaces highly resistant to corrosion. The compositions are formed by anhydrously reacting an epoxy trialkoxy silane with a primary amino trialkoxy silane in a stoichiometric molar ratio which provides one epoxy group for reacton with each primary amino hydrogen site to form the silane polymer coating composition. The composition is applied to the metal surface, and is hydrolyzed and dehydrated in situ to crosslink thereon and bond to the surface to form the corrosion-resistant coating.

6 Claims, No Drawings

CORROSION-RESISTANT SILANE POLYMER COATING COMPOSITIONS

CROSS-REFERENCE TO RELATED APPLICATIONS

This application is a continuing application of commonly-assigned application Ser. No. 07/631,562, filed 21 Dec. 1990, now U.S. Pat. No. 5,206,285, issued on 27 Apr. 1993.

BACKGROUND OF THE INVENTION

The present invention relates to coating compositions for application to metallic surfaces to impart corrosion resistance thereto, such as resistance to oxidation upon prolonged exposure to salt water, salt air and/or moisture in general.

A wide variety of corrosion-resistant coating compositions are known for application to metallic surfaces. Some such compositions are effective but are carcinogenic and have disadvantageous toxic properties which present a danger to persons exposed thereto, and to the environment, and therefore preclude their use for many applications. Metal chromate, permanganate, lead and, in general, heavy metal inhibitor compositions fall within this category.

Many known corrosion-inhibitor compositions, including chromates, require the use of strong acids such as sulfuric, hydrochloric, hydrofluoric or hydriodic acid, and organic solvents such as aromatic solvents and diluents which are ozone-depleting agents and/or are dangerous to the health and/or present environmental and toxic waste disposal problems. Such compositions include a wide variety of silicone polymer compositions, including those disclosed in U.S. Pat. No. 3,166,527. Such compositions, coated onto the metal workpieces and dried or cured by evaporation of the organic solvents, are only as effective as their ability to form a lasting adhesion to the metal surface.

Other silane/siloxane corrosion resisting compositions soluble in water/alcohol vehicles are known, such as disclosed in U.S. Pat. No. 3,234,144 for use in automobile coolant systems. Such compositions contain low molecular weight dimer and trimer compounds of organosilicon which are not crosslinkable during use, do not form integral, cured high molecular weight polysiloxanes, and/or require highly active organometallic catalysts.

SUMMARY OF THE INVENTION

The present invention relates to a relatively narrow class of low molecular weight polysiloxane polymer precursor compounds which are solubilized in aqueous solvents or diluents, and which can be applied to a metal surface, such as aluminum, hydrolyzed in-situ to cross-linkable silanol form and subjected to dehydration conditions to form dehydrated silanol sites, some of which cross-link with each other and others of which bond with the metal surface, to form an integrally-bonded, cured, corrosion-resistant high molecular weight coating from an aqueous coating composition. Preferably, the metal surface is first treated with alkali cleaners and is deoxidized. However, excellent results have been obtained on solvent vapor-degreased metal surfaces and on anodized metal surfaces.

The advantages of the present invention are made possible by the related discoveries that:

(a) certain epoxy trialkoxy silanes (A) having the formula:

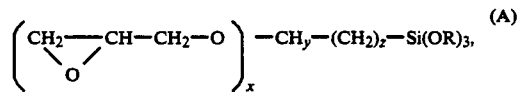

wherein x is an integer between 1 and 3, y equals 3−x, z is an integer between 1 and 3, and R is an alkyl group having 1 to 3 carbons, and certain primary amino trialkoxy silanes, (B) having the formula:

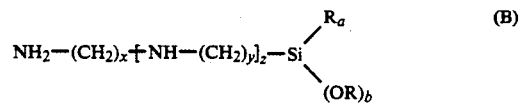

wherein x is an integer between 2 and 3, y is an integer between 1 and 3, z is an integer between 0 and 3, R is the same or a different alkyl group having to 3 carbons, a is an integer between 0 and 1 and b equals 3−a, are reactive when mixed in ethanol in a molar ratio providing one epoxy group from compound A for each primary amino hydrogen in compound B. The reactants are left standing at about room temperature for a period of approximately 24 hours under an inert gas atmosphere, such as nitrogen, to form low molecular weight polymer precursors which are acid-solubilized in an aqueous vehicle, such as a mixture of ethanol and water containing a specific amount of one or more low molecular weight volatile acids. The use of a catalyst, as required in prior known systems, is not necessary for the present reaction. The polymer precursors are formed by the bonding of one molecule of the epoxy silane to each of the hydrogen sites of the terminal primary amino group of the amino silane, to form a low molecular weight silane polymer precursor. The following reaction illustrates a preferred embodiment:

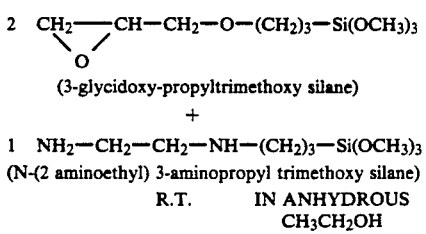

-continued

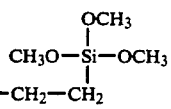
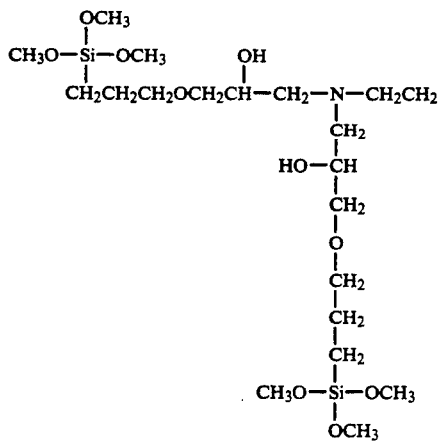

Such silane polymer precursors are acid solubilized in aqueous solvents to form stable solutions having good shelf life properties. These precursors are coatable from such solutions onto a suitable metallic surface under hydrolysis conditions which hydrolyze the methoxy groups of the precursor to form the corresponding silanol structure.

Thereafter, the hydrolyzed coating is subjected to dehydration conditions, which causes the silanol groups to crosslink with each other and to bond to the metal surface to form, in-situ, a strongly bonded high molecular weight corrosion-resistant polysiloxane metal coating while evaporating the weak acid solubilizing agent. The formed coating is exceptionally impervious to corrosive materials, such as salt water, salt fog, acid rain, etc., and exceptionally resistant to peeling, flaking, cracking, marring, filiform or other separation causes.

The relative stoichiometric proportions of the epoxy trialkoxy silane reactant A and the primary amino trialkoxy silane reactant B must be such that about one epoxy group of reactant A is available for reaction with each primary amino hydrogen of reactant B. Thus, the preferred reactants, 3-glycidoxy-propyltrimethoxy silane and N-(2 aminoethyl) 3-aminopropyl trimethoxy silane, are used in a molar ration of about 2:1. Where the reactant A contains 2 epoxy groups, it is used in a molar ration of about 1:1 relative to the reactant B, and where the reactant A contains 3 epoxy groups, it is used in a molar ratio of about 1.5:1 relative to the reactant B.

Suitable additional epoxy compounds A include:

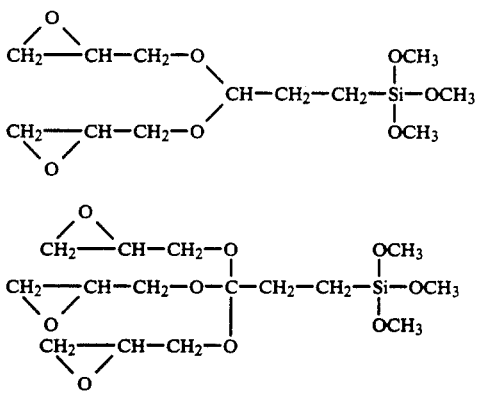

Suitable additional primary amino compounds B include:

| | |
|---|---|
| (A) | $H_2N(CH_2)_3Si(CH_3)(OC_2H_5)_2$ |
| (B) | $H_2N(CH_2)_2NH(CH_2)_3Si(OCH_3)_3$ |
| (C) | $H_2N(CH_2)_2NH(CH_2)_3Si(CH_3)(OCH_3)_2$ |
| (D) | $H_2N(CH_2)_2NH(CH_2)_2NH(CH_2)_3Si(OCH_3)_3$ |

Thus, it has been found that corrosion inhibition of aluminum surfaces can be increased from about four hours in a salt fog up to about 200 hours in the same salt fog by applying thereto the novel compositions of the present invention.

The hydrolysis of the methoxy silane precursor to the silanol precursor is illustrated:

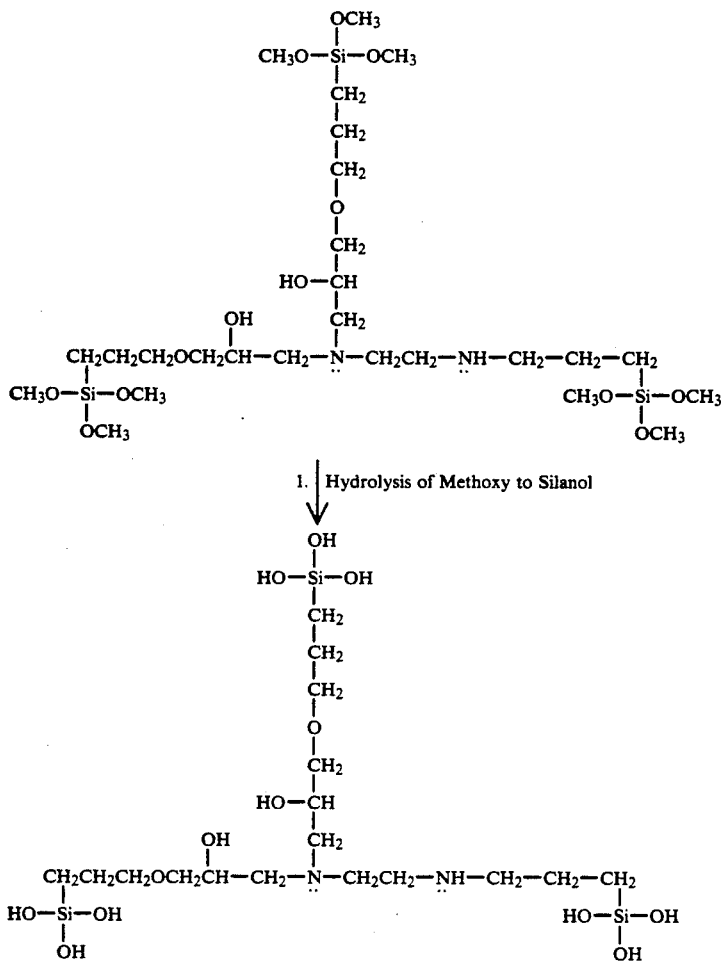
The dehydration reaction of the silanol precursor on an alkaline-cleaned, deoxidized aluminum surface, resulting in in-situ crosslinking and metal bonding, is illustrated:

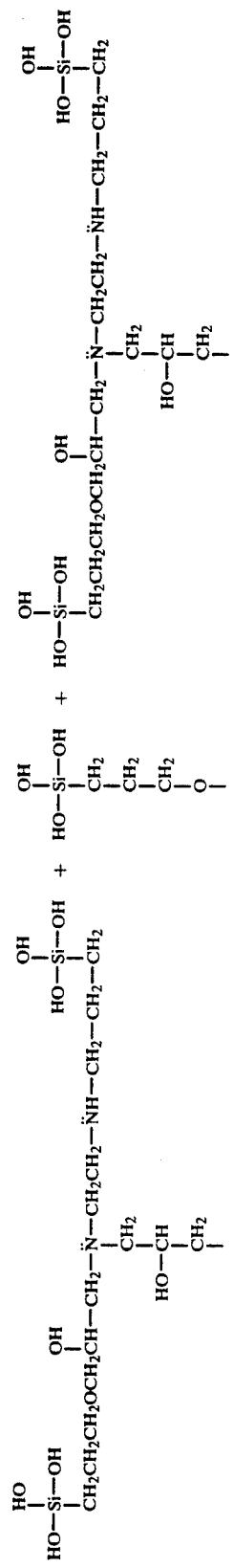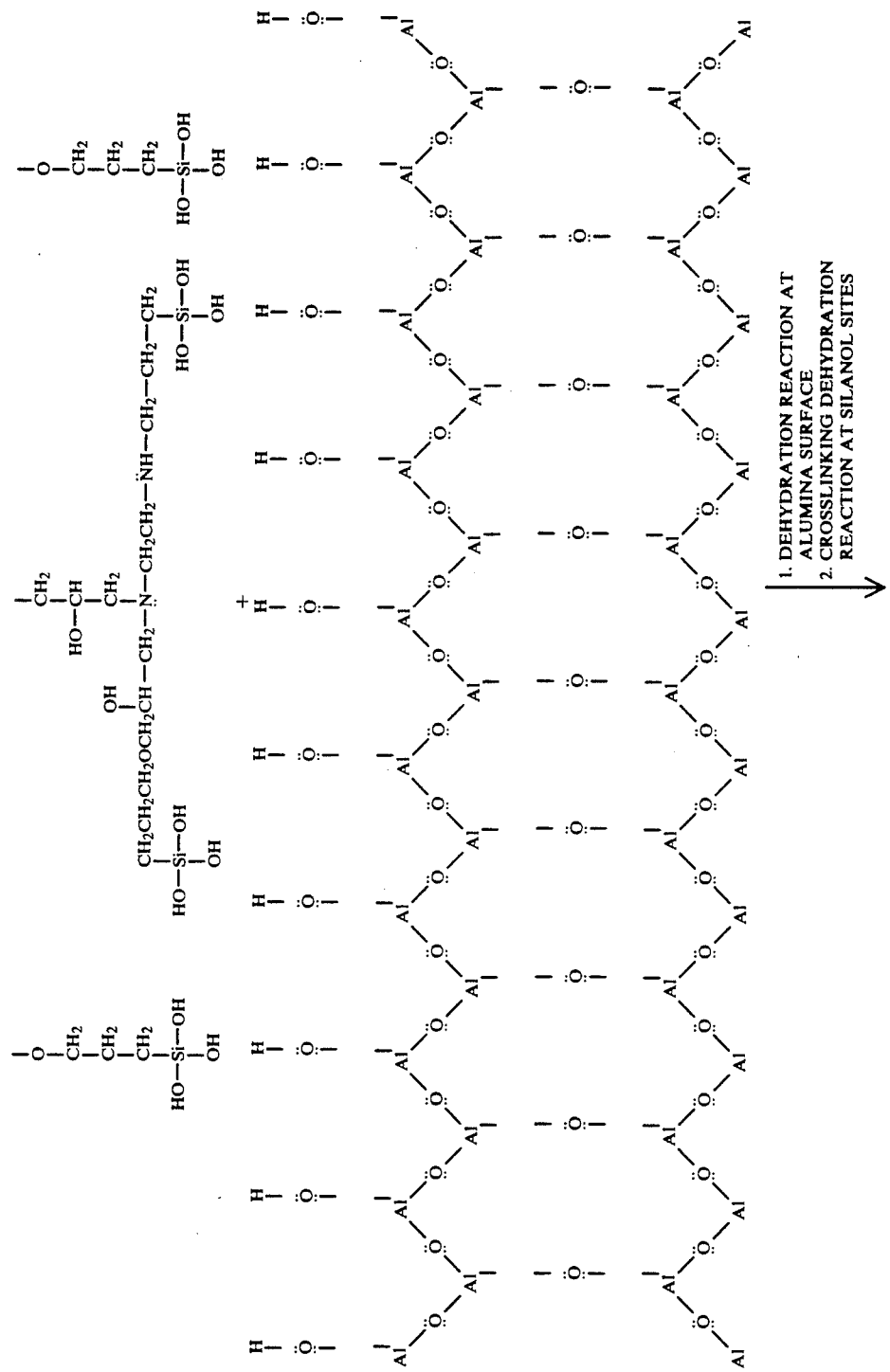

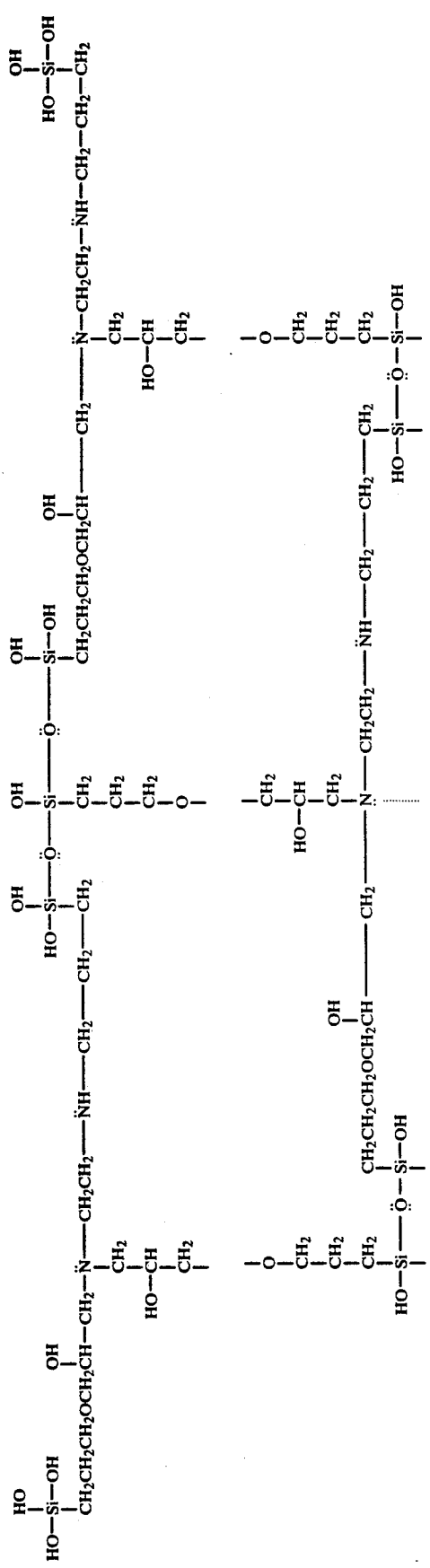

The formed conversion coatings also have excellent bonding properties for after-applied coatings or paints and therefore are excellent primers.

The present hydrolyzed silanol intermediate precursors must be formed in in-situ on the metallic surface because such silanol materials are unstable due to their tendency to crosslink during storage under ambient conditions. Crosslinking results in the formation of higher molecular weight polymeric materials which are insoluble in aqueous and non aqueous solvents and which are incapable of chemical bonding with metal surfaces, i.e., which do not have the essential properties of the novel hydrolyzable compositions of the present invention. It has been discovered that by maintaining a pH ranging from 4.5-6.5 with high vapor pressure organic acids such as acetic, formic and lactic acids, which are easy to evaporate, a stable aqueous formulation is achieved.

Furthermore, it has been discovered that by the use of silicone based wetting agents at low levels, e.g., 0.05-1.00% by weight, smooth morphological films and coatings are easily generated. Typical wetting agents are described by the following structural formulas A B & C:

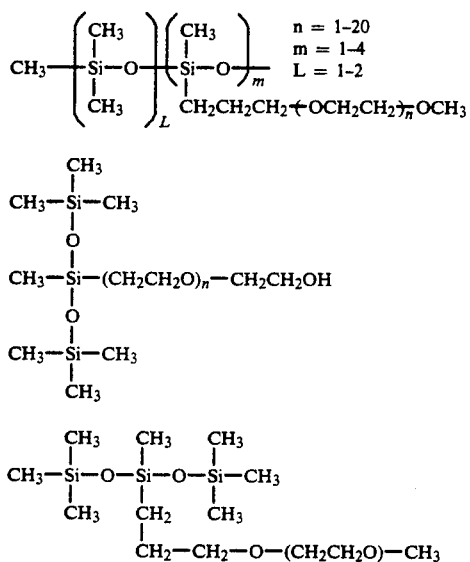

In addition, it has been demonstrated that by the addition of external crosslinking agents with the general molecular structure:

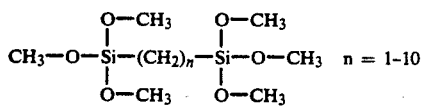

corrosion inhibition is increased. The optimum corrosion resistance is achieved when a mixture of crosslinkers is used, e.g., where (n) in the general formula is: n=2 (50%, n=4 (30%) and n=6 (20%)

The present compositions can be applied to any suitable metal surface requiring protection against corrosion by any conventional means in addition to coating them thereon, including spraying, dipping, rolling, brushing, and the like.

The aqueous, corrosion-resistant compositions of the present invention form a lasting chemical bond to the metal surface in an environmentally protective manner. Curing of the coated metal surface is accompanied by the evaporation of the weak acid solubilizing agent, rather than by evaporation of the organic, aromatic solvents and ozone-depleting agents of prior art corrosion-inhibiting compositions. The need for costly facilities and equipment to comply with air quality, hazardous waste, and personal health and safety laws and regulations is therefore substantially reduced.

However, where such facilities and equipment are already in place, or can be economically and practically provided, or are unnecessary under the laws and regulations of a particular region, the silane polymer precursors themselves may be applied to the metal surface in the solvent-based state, without acid-solubilizing them in an aqueous vehicle, to provide substantial corrosion resistance to the metal surface.

The silane polymer precursors are prepared as described above, i.e., by reacting the epoxy trialkoxy silanes with the primary amino trialkoxy silanes in ethanol in stoichiometric molar proportions providing one epoxy group for reaction with each primary amino hydrogen site. The reactants are as before left standing at about room temperature for a period of approximately 24 hours under an inert gas atmosphere and are then applied to the metal surface by coating, spraying, dipping, rolling, brushing, and the like.

The methoxy groups of the applied silane polymer precursor are hydrolyzed in situ to form the corresponding silanol structure by absorption of water vapor from the ambient atmosphere. Crosslinking and wetting agents, as discussed above for the aqueous-base compositions, may also be added to the solvent-base precursor compositions to increase corrosion resistance and to provide smooth morphological films and coatings on the metal surface.

The hydrolyzed coating is then dehydrated as discussed above, whereby the silanol groups crosslink and bond to the metal surface to form a strongly bonded, corrosion-resistant polysiloxane metal coating while evaporating the ethanol.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

What is claimed is:

1. A silane polymer coating composition for forming coatings having excellent bonding properties for metallic surfaces and capable of rendering said metallic surfaces resistant to corrosion, said silane polymer coating composition being formed by anhydrously reacting an epoxy trialkoxy silane with a primary amino trialkoxy silane in relative stoichiometric amounts providing one epoxy group for reaction with each primary amino hydrogen site, said reaction occurring for a period of approximately twenty-four hours at room temperature and under an inert gas atmosphere, said silane polymer coating composition being applicable to a metal surface and hydrolyzable thereon to form a silanol polymer capable of being dehydrated and crosslinked thereon, whereby a corrosion-resistant coating strongly bonded to said metal surface is formed, said silane polymer coating composition further comprising one or more additional alkoxy silane crosslinking agents.

2. A silane polymer coating composition according to claim 1 in which said crosslinking agent has the formula:

$$(CH_3O)_3\text{-Si}(CH_2)_n\text{-Si}(OCH_3)_3$$

wherein n is an integer from 1 to 10.

3. A silane polymer coating composition according to claim 1 in which said epoxy trialkoxy silane has the formula:

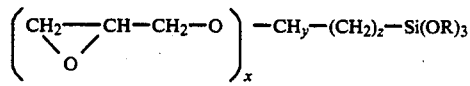

wherein x is an integer from 1 to 3, y equals three minus x, z is an integer from 1 to 3, and R is an alkyl group having from 1 to 3 carbon atoms.

4. A silane polymer coating composition according to claim 3 in which said epoxy trialkoxy silane comprises 3-glycidoxy propyltrimethoxy silane.

5. A silane polymer coating composition according to claim 1 in which said primary amino trialkoxy silane has the formula:

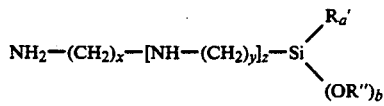

wherein x is an integer from 2 to 3, y is an integer from 1 to 3, z is an integer from 0 to 3, R' and R" are each alkyl groups having from 1 to 3 carbon atoms, a is an integer from 0 to 1 and b equals 3 minus a.

6. A silane polymer coating composition according to claim 5 in which said primary amino trialkoxy silane comprises N-(2-aminoethyl) 3-aminopropyltrimethoxy silane.

* * * * *